Jan. 10, 1933.  O. F. WARHUS  1,894,075
MOTOR VEHICLE
Filed Nov. 21, 1927    2 Sheets-Sheet 1
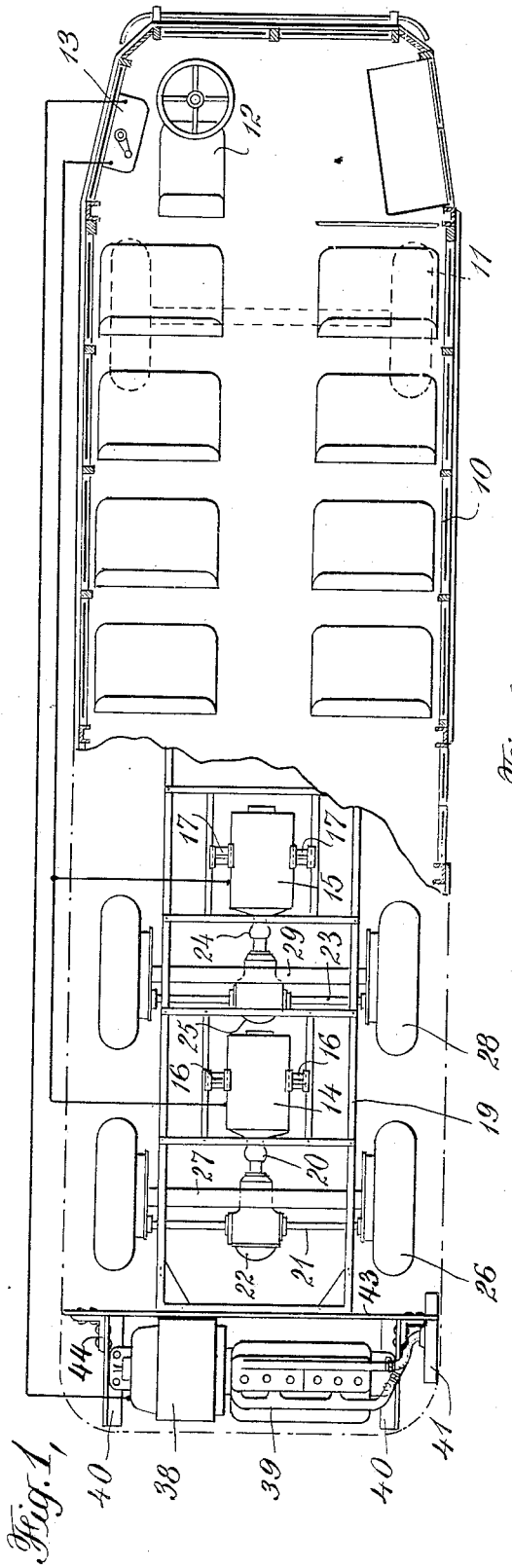
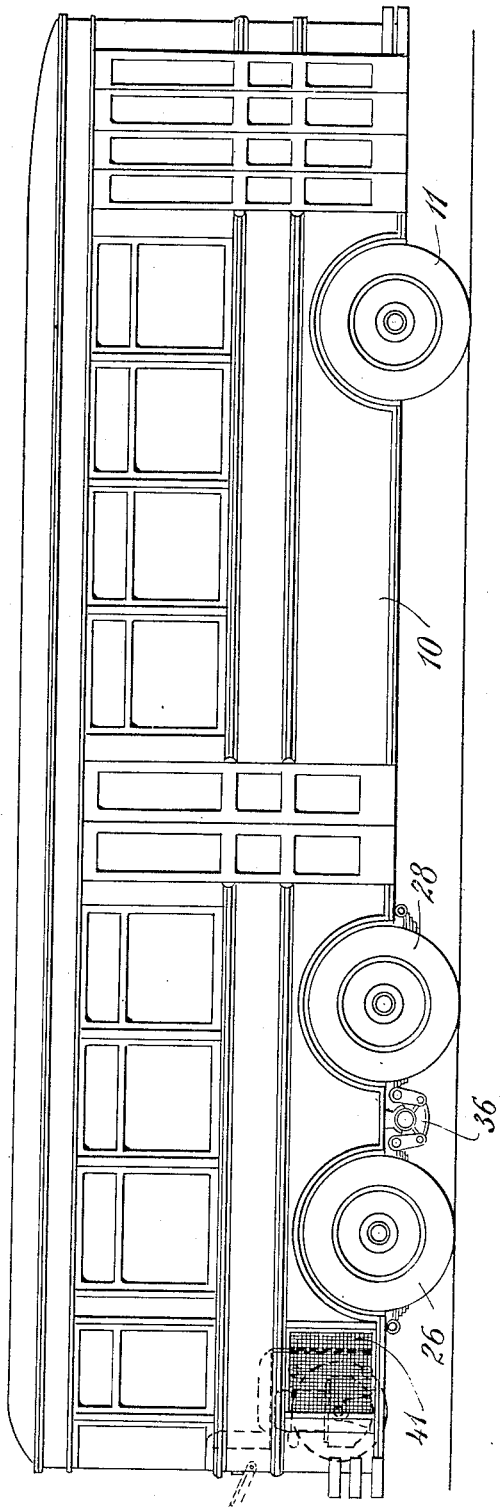
INVENTOR
Oliver F. Warhus
BY
ATTORNEYS Jan. 10, 1933.  O. F. WARHUS  1,894,075
MOTOR VEHICLE
Filed Nov. 21, 1927  2 Sheets-Sheet 2
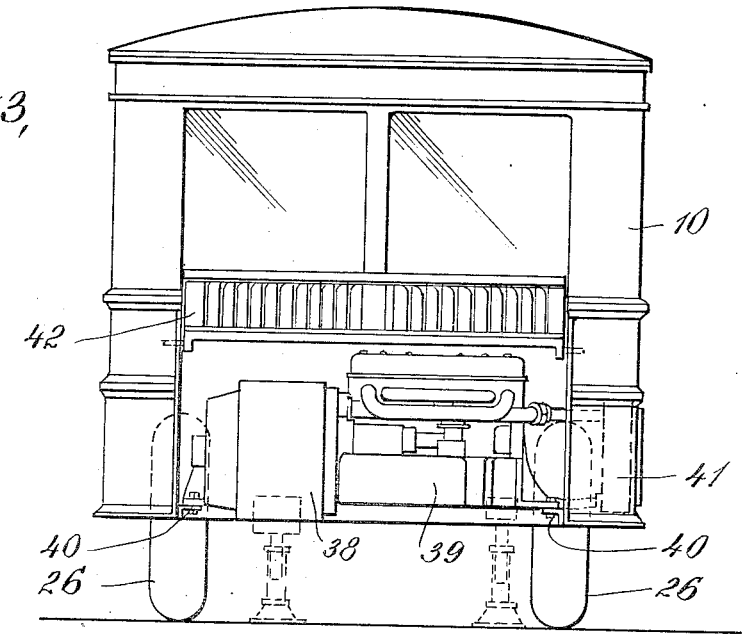
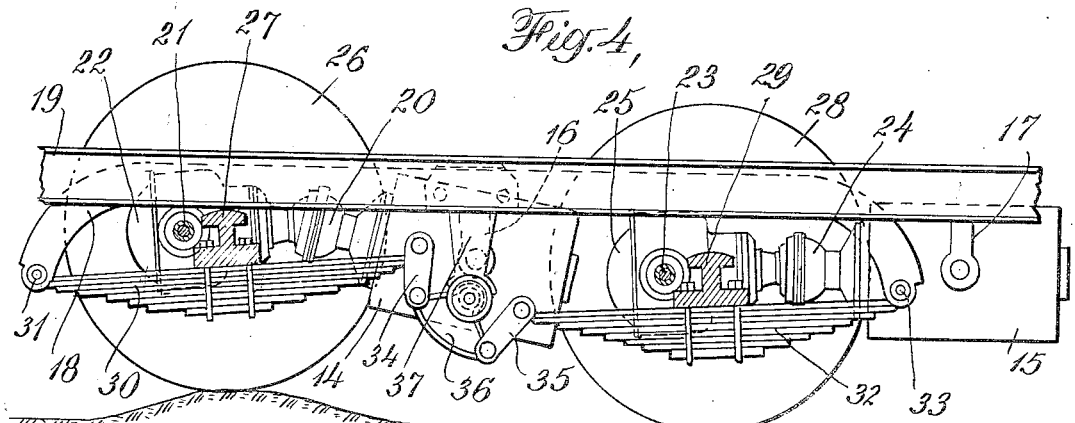
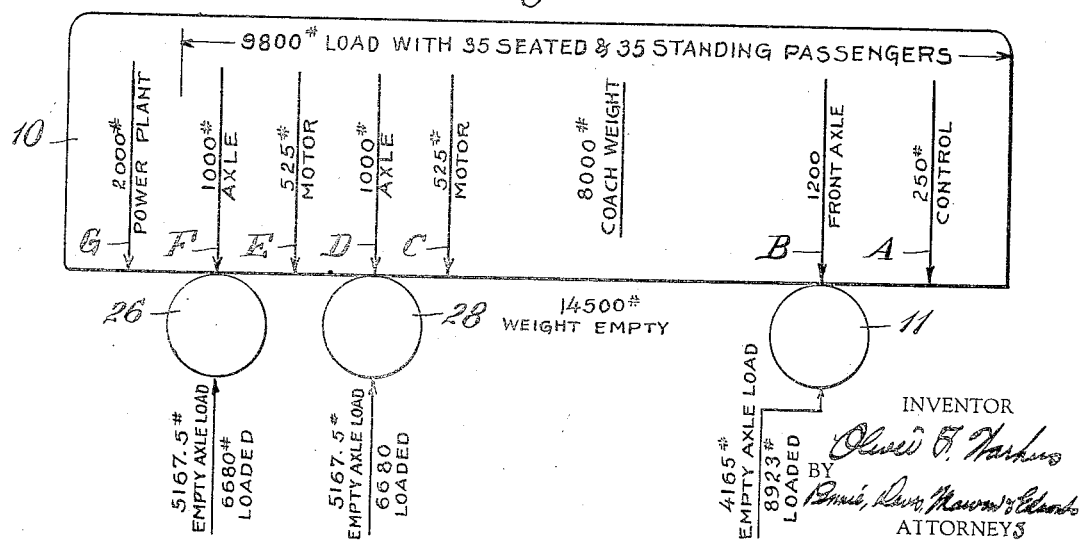

Patented Jan. 10, 1933

1,894,075

UNITED STATES PATENT OFFICE

OLIVER F. WARHUS, OF ALBANY, NEW YORK, ASSIGNOR, BY MESNE ASSIGNMENTS, TO THE CINCINNATI CAR CORPORATION, OF CINCINNATI, OHIO, A CORPORATION OF OHIO

MOTOR VEHICLE

Application filed November 21, 1927. Serial No. 234,640.

This invention relates to road vehicles operated by an internal combustion engine, electric motor or combination internal combustion engine and electric motor, and is concerned especially with that type of vehicle employed for carrying passengers which is commonly known as the trackless trolley or motor coach. In order to provide for economical operation of motor coaches, it is desirable to provide as much space for passengers as is possible within the limits of mobility of the vehicle. These space requirements result in vehicles of large dimensions carrying tremendous loads, and in order to build such vehicles of sufficient strength without sacrificing mobility, these loads must be distributed as equally as possible between the several wheels and throughout the body structure in such a way as to facilitate the frequent starting and stopping necessarily accompanying the operation of such vehicles. In order to provide as much available passenger space as possible within the exterior confines of the vehicle, it is also desirable to eliminate such space-occupying projections as the engine or motor hood, and the like.

It is the principal object of this invention to provide a vehicle of such construction that practically all of the space within the confines of the vehicle is available as useful space and still have the heavy loads distributed as equally as possible between the several wheels and at the same time to decrease the harmful effects of the inertia and momentum of the vehicle caused by the momentary shifting of the heavy loads to certain parts thereof which accompanies the starting and stopping of the vehicle, because of the sudden starting and braking torques set up by the driving and braking wheels respectively. By virtue of this regular distribution of these varying loads and the accompanying relief of the starting and stopping torques, vehicles of the type described may be more readily handled and operated and ensure greater comfort to the passengers while at the same time because of these advantages, vehicles may be made in larger sizes without decreasing the mobility thereof.

The invention is particularly concerned with the six-or-eight-wheeled coach type of motor vehicle in which power is supplied by means of an internal combustion engine driven generator, the generator and engine combination being preferably of a direct-connected unit type. The use of this unit gas-electric power plant involves numerous advantages not obtainable by the engine drive, and among these advantages are the simple transmission of electric power from a single prime mover to two or more driving axles the elimination of the clutch and the transmission gearing, uniform acceleration without racing the engine, less vibration, and a lower engine speed than is possible with the straight geared drive.

In order to acquire practically all of the space within the exterior confines of the vehicles as available passenger space, it is desirable that the power plant be mounted on the rear of vehicle instead of in front, while the driving apparatus may be conveniently carried on the truck frames or wheel axles beneath the coach body. This coach construction eliminates the usual space-occupying motor hood at the front of the coach and places the motor wholly within the confines of the coach body and out of the way, since the only interior projection necessary will be an elongated ledge extending across the rear of the coach interior, and this ledge may be used as the rear seat. By mounting the power plant in the rear of the vehicle, it may be easily inspected by opening a door in the rear of the body, and may be readily removed and replaced merely by inserting jacks beneath the unit as a whole without employing overhead cranes and the like. Furthermore, oil or gas fumes and engine heat are not transmitted to the interior of the coach through pedal and lever openings by the draft induced by motion of the vehicle and the engine fan, and the radiator units may be independently mounted in the sides of the coach body where they are not disturbed during inspection or dismounting of the motor unit.

In order to maintain the load distribution equally and constant when the vehicle is starting and stopping, as well as when it is standing still, it is necessary to employ more than four wheels so that the starting and stopping torques applied to the driving wheels, assuming that they are in the rear of the vehicle, may be absorbed between the four rear wheels without being transmitted to the coach frame. If only two wheels were employed at the rear, the starting torque would create a greater momentary load toward the rear of the vehicle with an accompanying decrease in the load toward the front of the vehicle caused by the pivoting of the load about the driving axle. Therefore, at least four wheels are required toward the rear of the vehicle while two or more wheels are necessary toward the front of the vehicle for steering and support, the two rear sets of wheels accordingly absorbing the driving and braking torques and bracing the vehicle against pivoting about any one point during starting. In order to provide for this torque absorption between the four rear wheels at all times even during the momentary disturbances caused by irregularities in the road, an equalizing mechanism is provided between the two wheels on each side. This equalizing mechanism consists of a movable shackle connection between the adjacent ends of the springs on each side of the vehicle while the far ends of the springs are connected positively to the frame of the vehicle. This equalizing mechanism ensures that the driving and braking torques are absorbed and that the drive from each drive axle is transmitted equally through the two rear axles, regardless of the relative positions of the wheels, the attached springs and the pivot pin connection to the frame, while at the same time allowing a limited play between both pairs of rear wheels to compensate for bumps and irregularities in the road surface.

For a better understanding of the invention, reference is made to the accompanying drawings in which Figure 1 illustrates a plan view of a vehicle frame constructed according to the invention;

Fig. 2 is a side elevation of a coach body;

Fig. 3 is a rear elevation of the same showing the power plant assembly;

Fig. 4 illustrates the equalizing mechanism applied to the rear wheels of the vehicle; and Fig. 5 is a load diagram illustrating the distribution of the load on a vehicle constructed according to the invention.

In these drawings numeral 10 designates the coach body which is preferably of box-like construction having a blunt front which extends forward of the front and steerable wheels 11. The interior of the coach body 10 is suitably arranged with seats for passengers, and the operator's seat 12 is placed as far forward in the coach body 10 as is possible so that he may be able to see more readily in front of the vehicle. The electric controller 13 is preferably placed at the operator's left hand and may be of the resistance type for simultaneously controlling driving motors 14 and 15 pivotally mounted upon rigid brackets 16 and 17 depending from the four wheel truck frame 18 which is riveted or otherwise rigidly mounted upon the frame 19 of the coach. The frame 19 may be either a chassis frame or longitudinal beams which are supported by and form part of the box-like vehicle body, as disclosed in my prior Patent No. 1,673,786, issued June 12, 1928. Motor 14 is flexibly connected to the propeller shaft through a universal joint contained in flexible ball-and-socket housing 20 while the propeller shaft is connected to rear driving axle 21 through a differential contained in housing 22. Motor 15 is similarly connected to drive shaft 23 through a universal joint contained in flexible housing 24, a propeller shaft and a differential contained in housing 25. Shaft 21 drives wheels 26 which are mounted upon axle 27 while shaft 23 drives wheels 28 which are mounted upon axle 29. Axle 27 is carried by springs 30, the outer ends of which are positively connected to truck frame 18 by pivot pins 31, while axle 29 is similarly supported by springs 32, the outer ends of which are positively connected to truck frame 18 by pivot pins 33. The adjacent inner ends of springs 30 and 32 on each side of the truck are connected by shackles 34 and 35, respectively, to rocker arm 36 which is pivotally mounted upon a bracket 37 depending from and rigidly carried by the truck frame 18.

The power plant of the vehicle, which is shown most clearly in Figs. 1 and 3, consists of an electric generator 38 directly coupled with and rigidly mounted to internal combustion engine 39 to form a rigid unit. This unit power plant is disposed in a space provided therefor in the rear end of coach body 10 and is mounted upon the frame 19 of the coach by means of a transverse member 43 upon which is mounted by cleats 44 a pair of rearwardly extending cantilever brackets 40 which support the unit at each end. The radiator for the internal combustion engine 39 is rigidly mounted in the side of the coach body 10, as shown at 41 in Fig. 2, so as to be directly in front of the fan of the engine 39. The opposite side of the motor body 10 is provided with louvres or the like, not shown, in a position corresponding to that of radiator 41, whereby a thorough circulation of air over the entire power unit is induced by the fan of the internal combustion engine 39 through the openings in radiator 41. The power plant comprising engine 39 and generator 38 may be readily inspected merely by raising drop door 42 hinged to and forming part of the rear wall of the coach body 10. The power plant unit is accessible for removal from underneath the rear end of the coach by means of ordinary mechanical jacks beneath the generator and engine as shown in phantom in Fig. 3. By removing the bolt fastenings in brackets 40, the whole power unit may be raised clear of brackets 40 and the coach move forwardly, leaving the power plant unit standing free thereof. In this way the power plant may be readily removed and likewise replaced in a short time without tearing down any parts of the vehicle or interfering with the other operating parts, and without the use of overhead cranes and the like.

In Fig. 5 is shown a load diagram illustrating the distribution of the load in a vehicle embodying the present invention. Assuming for purposes of illustration that the weight of the whole vehicle when empty is 14,500 lbs. and that when loaded with 35 seated passengers and 35 standing passengers an additional weight of 9,800 lbs. is added. In this load diagram, load arrow A represents the 250 lb. weight of the control mechanism at the front of the vehicle; arrow B at the front axle the 1200 lb. weight of the front axle and steering mechanism; arrow C the 525 lb. load of the driving motor 15 for wheels 28; arrow D the 1000 lb. load of rear axle 29; arrow E the 525 lb. weight of motor 14 for wheels 26; arrow F the 1000 lb. load of rear axle 27, while arrow G represents the 2,000 lb. load of the unit power plant at the rear of the vehicle. If the coach body proper weighs 8,000 lbs., the empty load on front wheels 11 is equal to 4,165 lbs. while the empty load on wheels 26 and 28 is equal to 5,167½ lbs. for each pair of wheels. When loaded with the 70 passengers, front wheels 11 take an 8,923 pound load, while each pair of rear wheels take a 6,680 pound load. It will be evident therefore that the location of the 2000 lb. power plant at the rear of the coach relieves the front wheels 11 of this considerable load so that the guiding and handling of the whole coach is more readily accomplished and facilitated, while at the same time the load distribution at the rear of the coach permit driving wheels 26 and 28 to produce a greater tractive effort.

In vehicles having only four wheels and a rear driving axle the sudden starting torque introduced into the driving axle causes a momentary shifting of the load toward the rear of the vehicle with a tendency of the whole to pivot about the rear axle or the line of contact of the two rear wheels with the road. This sudden application of a heavy load to the driving mechanism when it is under the strain of overcoming the inertia of the large mass is often sufficient to cause breakage of the driving parts such as the differential mechanism and the like, while the front of the vehicle is temporarily so lightened of load that it becomes difficult to guide. In order to absorb the sudden starting and braking torques and prevent them from reaching the vehicle frame, four rear wheels with a torque absorbing equalizing mechanism interposed between them is necessary. Such equalizing action could obviously not be obtained if only two rear wheels were used. Assuming that the motors 14 and 15 are suddenly thrown into operation, the torques set up in their propeller shafts introduce a moment about the drive axles which if not absorbed, would be transmitted to the coach frame. By virtue of the equalizing mechanism motors 14 and 15 are tilted about their trunnions, the propeller shafts are bent through their universal couplings, and the springs are tilted about pivotal rocker arm 36, all of this movement being relatively to the coach frame, so that none of the torque is received thereby. Accordingly, the coach as a whole is unaffected by the torques set up in the rear truck and the loads thereof are undisturbed. These four wheels, in providing a two-line contact with the road, also brace the rear of the coach body against this rotational tendency about the driving axles and consequently the momentary shifting of the load toward the rear of the coach when starting is eliminated, whereby a further insurance against disturbing the load during starting is provided. This stability of the load continues as well as during braking when a similar but opposite tendency takes place due to the inertia and momentum of the heavy load. The four rear wheels although bracing each other and absorbing the torques are not immovable relatively to each other, but the equalizing mechanism comprising rocker bar 36, shackles 34 and 35 and springs 30 and 32 permits axles 27 and 29 and wheels 26 and 28 to move in a vertical direction relatively to each other about pivot pins 31 and 33 whenever the wheels strike a bump or depression in the road. At the same time the relative movement of the axles and wheels is accompanied by a tilting of motors 14 and 15 about their supporting brackets 16 and 17, respectively, since the flexible universal joint housings 20 and 24, respectively, permit a flexing of the propeller shaft connecting motors 14 and 15 to drive shafts 21 and 23, respectively. This is illustrated in Fig. 4 in which wheels 26 are mounting an elevation in the road bed so that they are raised above the level of wheels 28. Accordingly, although wheels 26 and 28 and the equalizing mechanism absorb the torque, the wheels are nevertheless flexible with respect to each other to compensate for irregularities in the road bed, thereby insuring smooth riding and comfort to the coach passengers.

The new construction of motor driven road vehicles, especially of the trackless or motor bus type, wherein the power plant is mounted on the rear, thus providing larger passenger space, also insures that the distribution of the load between the several supporting wheels is undisturbed so that no part of the coach structure as a whole receives excessive strains during any period in the operation of the vehicle, even while suddenly starting or stopping the coach, since the sudden shocks are absorbed by the four wheel and equalizing mechanism combination. This location of the power plant also makes available, as useful space, the position heretofore occupied by the power plant; viz., in the front of the vehicle so that the whole area of the coach is available for passenger space and even the ledge formed by the housing of the power plant at the rear of the coach body may be provided with a seat for passengers.

I claim:

1. A motor vehicle comprising a frame, a set of steerable wheels supporting the front end of the frame, a four-wheel truck supporting the rear end of the frame, a power plant supported by the rear end of the frame and extending rearwardly of the rear truck wheels, driving connections between the truck wheels and the power plant, and equalizing mechanism for absorbing torque between the front and rear wheels of the truck.

2. A motor vehicle comprising a body structure, a compartment formed in the extreme rear of the structure and extending rearwardly of the rear wheels, an internal combustion engine mounted in the compartment, a radiator for the engine mounted in the side of the body structure, a door in the body structure leading to the compartment, at least four wheels supporting the body structure, and drive connections between the engine and at least two of said wheels.

3. A motor vehicle comprising a frame, a four wheel truck supporting the rear end of the frame, a set of wheels supporting the front end of the frame, equalizing connections for absorbing the load torque between the wheels on each side of the truck, a power-plant, means mounted on the frame and extending rearwardly of the rear truck for supporting the power-plant, driving connections between the power plant and at least two of the wheels, and a body carried by the frame and enclosing the power plant.

4. A motor vehicle comprising a frame, a four wheel truck supporting the rear end of the frame, a set of wheels supporting the front end of the frame, equalizing connections for absorbing the load torque between the wheels on each side of the truck, a power-plant, means mounted on the frame and extending rearwardly of the rear truck for supporting the power-plant, driving connections between the power plant and at least two of the wheels, a body carried by the frame and enclosing the power plant, and a door in the rear of the body for access to the power plant.

5. A motor vehicle comprising a frame, a four wheel truck supporting the rear end of the frame, a set of wheels supporting the front end of the frame, equalizing connections for absorbing the load torque between the wheels on each side of the truck, a power-plant, brackets rigidly mounted upon the rear end of the frame and extending rearwardly of the rear truck, removable connections between the power plant and the brackets, a housing supported by the frame for enclosing the power plant, and a door in the housing for access to the power plant.

6. A motor vehicle comprising a frame, at least six wheels supporting the frame, a power plant unit comprising an engine driven electric generator, means at the rear of the frame and extending rearwardly of the rear wheels for removably mounting the unit, an electric motor for driving at least two of the wheels, and connections between the generator and the motor.

7. A motor vehicle comprising a frame, at least four wheels supporting the frame, mounting means at the rear of the frame, a power plant unit comprising an engine-driven electric generator, removable connections between the unit and said means for mounting the unit cross-wise of the rear end of the frame and extending rearwardly of the rear wheels, a radiator for the engine in the side of the frame, a door on the rear of the frame for access to the unit, a drive motor for at least two of the wheels, and connections between the generator and the motor.

8. A motor vehicle comprising a frame, at least four wheels supporting the frame, mounting means at the rear of the frame, a power plant unit comprising an engine-driven electric generator, removable connections between the unit and said means for mounting the unit cross-wise of the rear end of the frame and extending rearwardly of the rear wheels, a radiator for the engine in the side of the frame, a door on the rear of the frame for access to the unit, a drive motor for at least two of the wheels, connections between the generator and the motor, and a means for controlling the connections between the generator and the motor.

9. A vehicle comprising a frame, at least three sets of wheels on which the frame is supported, two of said wheel sets being mounted adjacent each other toward the rear of said frame, cantilever brackets extending beyond one end of the frame, a power unit supported on said brackets so as to overhang the wheels at that end of the frame, and a body structure secured to said frame and enclosing said unit.

10. A vehicle comprising a frame, at least three sets of wheels upon which the frame is supported, two of said wheel sets being mounted adjacent each other toward the rear of said frame, a plurality of brackets extending rearwardly of the frame and the rear set of wheels, a power plant mounted upon said brackets, and a body structure secured to said frame and enclosing said unit.

11. A vehicle comprising a frame, front and rear sets of wheels upon which the frame is supported, a transverse member near the rear end of the frame and extending rearwardly of the rear set of wheels, brackets extending rearwardly from said member, a power plant mounted upon said brackets, and a body structure secured to said frame and enclosing said unit.

12. A vehicle comprising a frame, front and rear sets of wheels upon which the frame is supported, brackets secured to the frame and extending rearwardly of the rear set of wheels, a power plant mounted upon said brackets, and a body mounted on said frame and having a portion enclosing said power plant.

13. A vehicle comprising a frame, front and rear sets of wheels upon which the frame is supported, a transverse member mounted upon said frame, brackets secured to said member and extending rearwardly of the rear set of wheels, a power plant mounted supported, a transverse member mounted upon said frame, brackets secured to said power plant.

14. In a motor vehicle, the combination of a frame, a body having an open rear end mounted upon said frame, a plurality of pairs of wheels supporting the frame, a pair of brackets extending from the frame rearwardly of the rear wheels, a power plant supported thereon, and means for removably securing the power plant upon said brackets, whereby the power plant may be disconnected from said brackets and removed from the open end of the body.

15. A motor vehicle comprising a frame, steerable and drivable wheels supporting the the frame, a compartment in the extreme rear of the frame, brackets extending rearwardly of the frame and rear wheels and within the compartment, a power plant mounted on the brackets, connections between the power plant and the drivable wheels, said compartment having an open bottom and an opening in the rear through which the power plant may pass, whereby when the power plant is disconnected from the brackets and the connections with the drivable wheels and jacked up, the vehicle may be moved forward, leaving the power plant standing free thereof.

16. A motor vehicle comprising a frame, drivable wheels for said frame, a compartment in the extreme rear of the frame, a power-plant-support within the compartment, a power plant mounted on said support, connections between the power plant and the drivable wheels, said compartment having an opening in the bottom beneath the power plant and extending to the rear of the compartment and an opening in the rear through which the power plant may pass, whereby when the power plant is disconnected from its support and the connections with the drivable wheels and jacked up the vehicle may be moved forward, leaving the power plant standing free thereof.

17. A motor vehicle comprising a frame, a body mounted on the frame, at least four wheels supporting the frame, members extending rearwardly of the frame and rear wheels for mounting a power plant, an extension on the rear of the body to enclose the members and the power plant supported thereby, the upper portion of said extension overlying said members and forming a part of the seating space to be occupied by the passengers, the lower portion of said extension having an opening in the rear through which the power plant may pass and an opening in the bottom beneath the power plant and extending to the rear of the extension whereby when the power plant is disconnected from its mounting and jacked up, the vehicle may be moved forward leaving the power plant standing free thereof.

18. A motor vehicle comprising a frame open in the rear, a running gear for supporting said frame, an electric motor associated with the running gear for driving the vehicle, a body having a rear compartment mounted on the frame, a base detachably mounted upon the open rear end of the frame within the rear compartment, an internal combustion engine and an electric generator coupled together and mounted upon the base within the compartment for supplying energy to the motor.

In testimony whereof I affix my signature.

OLIVER F. WARHUS.

CERTIFICATE OF CORRECTION.

Patent No. 1,894,075.  January 10, 1933.

OLIVER F. WARHUS.

It is hereby certified that error appears in the printed specification of the above numbered patent requiring correction as follows: Page 5, lines 33 and 34, claim 13, strike out the words "supported, a transverse member mounted upon said frame, brackets secured to" and insert instead "upon said brackets, and a body mounted on said frame having a portion enclosing"; and that the said Letters Patent should be read with this correction therein that the same may conform to the record of the case in the Patent Office.

Signed and sealed this 28th day of February, A. D. 1933.

(Seal)

M. J. Moore.
Acting Commissioner of Patents.